US009689717B2

(12) United States Patent
Remillard et al.

(10) Patent No.: US 9,689,717 B2
(45) Date of Patent: Jun. 27, 2017

(54) PHASE ESTIMATION METHOD AND APPARATUS THEREFOR

(71) Applicant: GSI Group Corporation, Bedford, MA (US)

(72) Inventors: Paul A. Remillard, Littleton, MA (US); Bruce A. Horwitz, Newton, MA (US)

(73) Assignee: Novanta Corporation, Bedford, MA (US)

( * ) Notice: Subject to any disclaimer, the term of this patent is extended or adjusted under 35 U.S.C. 154(b) by 203 days.

(21) Appl. No.: 14/469,753

(22) Filed: Aug. 27, 2014

(65) Prior Publication Data

US 2015/0048242 A1 Feb. 19, 2015

Related U.S. Application Data

(63) Continuation of application No. PCT/US2013/029102, filed on Mar. 5, 2013.

(60) Provisional application No. 61/606,606, filed on Mar. 5, 2012.

(51) Int. Cl.
*G01D 5/347* (2006.01)
*G01D 5/244* (2006.01)

(52) U.S. Cl.
CPC ....... *G01D 5/34776* (2013.01); *G01D 5/2448* (2013.01); *G01D 5/3473* (2013.01)

(58) Field of Classification Search
CPC . G01D 5/34776; G01D 5/2448; G01D 5/3473
USPC .................................................. 250/231.14
See application file for complete search history.

(56) References Cited

U.S. PATENT DOCUMENTS

| 5,646,730 A | 7/1997 | Mitchell et al. |
| 2003/0112018 A1 | 6/2003 | Remillard et al. |
| 2004/0052217 A1 | 3/2004 | Anghel et al. |
| 2005/0194524 A1 | 9/2005 | Remillard et al. |

(Continued)

FOREIGN PATENT DOCUMENTS

WO 2007092402 A2 8/2007

OTHER PUBLICATIONS

Extended European Search Report for European Patent Application No. EP 13757149 mailed Sep. 22, 2015, from the European Patent Office, 7 pages.

*Primary Examiner* — Renee Chavez
(74) *Attorney, Agent, or Firm* — BainwoodHuang

(57) ABSTRACT

Phase estimation apparatus processes sensor signals from sensors to estimate a phase of a periodically varying state of an object, such as position of a moving object. A phase estimation processor applies a first correlation calculation to simultaneously collected samples of the sensor signals to generate first quadrature values, where the first correlation calculation employs variable calculation values, and applies a phase calculation to the first quadrature values to generate the phase estimation. A pre-quadrature calibration circuit applies respective second correlation calculations to respective sequences of samples of the sensor signals individually to generate second quadrature values for each of the sensor signals, and applies phase and/or magnitude calculations to the sets of second quadrature values to generate the variable calculation values for the first correlation calculation, thereby compensate for the error component and improve accuracy of the estimated phase.

13 Claims, 5 Drawing Sheets

(56) References Cited

U.S. PATENT DOCUMENTS

| | | |
|---|---|---|
| 2006/0186360 A1 | 8/2006 | Remillard et al. |
| 2007/0032970 A1 | 2/2007 | Desailly et al. |
| 2009/0034641 A1 | 2/2009 | Jansson |
| 2009/0287463 A1 | 11/2009 | Turner |
| 2010/0088053 A1 | 4/2010 | Sato |
| 2010/0101860 A1 | 4/2010 | Wassermann et al. |
| 2010/0185409 A1 | 7/2010 | Seo |
| 2011/0025312 A1* | 2/2011 | Nagano ............... G01D 5/145 324/207.25 |

* cited by examiner

PHASE ESTIMATION METHOD AND APPARATUS THEREFOR

BACKGROUND OF THE INVENTION

The present invention generally relates to the field of sinusoidal phase estimation and more particularly to the field of phase estimation for absolute position sensing purposes. Most particularly the present invention relates to phase estimation for absolute angular position sensing.

As is well known, position sensing devices generally fall into two categories; analog, in which a measured signal (for example, a voltage or current) is related to the position of the object being observed in a known way, and digital, in which the output signals from one or more sensing elements are combined and processed to provide a numerical representation of the position of the object. Position sensing devices that provide a numerical representation are often called encoders because the position of the object is "coded" as a number.

Position sensors are also categorized as linear or rotary, which indicates whether they are designed to sense linear or rotary position changes of the object being observed and further can be "incremental" or "absolute" position sensors. Incremental sensors or encoders measure changes in position only and thus require some sort of memory to provide the base point from which the measured changes are evaluated. The typical output of an incremental encoder's sensor head is a simple binary train wherein each pulse increments a counter by one least significant bit. Absolute encoders or position sensors, on the other hand, produce a signal that, at any instant, is related to the object's position relative to an a priori designated zero point.

Encoders and position sensors generally comprise a position indication generator, two or more sensors which serve as the signal source(s) for processing, and an electronic signal processing system. In many systems the position indication generator, when combined with the two or more sensors produces substantially sinusoidal signals, wherein the phase(s) of the sinusoid(s) are related to the position of the object of interest.

If these signals were perfect, relatively simple processing could be successfully applied. However, in many encoder systems the signals are not perfect, so advanced, self-adapting processors are advantageous.

In many previous encoder systems, in which the position indication generator and sensors produce sinusoidal signals, the multiple detectors are closely spaced, often being directly adjacent to each other. Additionally, these detectors are often large when compared to the period of the sinusoid they are sensing. Often, these encoders typically have been designed to sample the sinusoidal signal at 90 degree intervals and in fact have detectors that integrate the signal over substantially a full quarter cycle. Examples of such encoders are taught, for example, by Mitchell et al. in U.S. Pat. No. 5,646,730.

There are several beneficial features inherent in the design of these encoders. Because the multiple detectors are closely adjacent to each other they share many environmental and electrical conditions. For a light-based encoder, for example, the optical power falling on the detectors is relatively uniform. Similarly, if the detectors are part of a custom made linear array, as if often the case, the opto-electrical properties of all the detectors are virtually identical and their output signals pass through virtually identical, on-chip electronic elements (viz., pre-amplifiers). Additionally, detectors that are large, as a fraction of a period, inherently integrate over that fraction of a period, smoothing out noise and eliminating the effects of higher harmonics of the base sinusoid. Finally, it is typical in encoders of this sort of design that the detector array, instead of having just enough detectors to sense one cycle of the sinusoid, have enough detectors to sample some number of adjacent cycles of the sinusoid, improving the signal-to-noise ratio of the output signals and enhancing the averaging out of any position indication generator errors.

Although the above encoders generate high-quality and accurate output signals, they are nonetheless subject to certain kinds of errors that can degrade accuracy. Thus, certain phase estimation methods have been designed to work with the signals generated by these common, previous encoders. For example, see Remillard et al., U.S. Pat. No. 6,897,435, which describes a self-calibrating phase estimation method particularly well suited for processing encoder signals that use the so-called 4-bin process, such as the encoder described in Mitchell (op. cit.).

BRIEF SUMMARY OF THE INVENTION

Some encoder systems have somewhat different characteristics, including separation between different sensors or detector elements that can introduce corresponding errors that may be absent or negligible in a more integrated encoder such as mentioned above. The sensors may have different performance characteristics by virtue of separate manufacture, especially if no binning or analogous process is used for uniform performance. Also, there may be errors arising from non-ideal mechanical arrangement of the sensors with respect to the object. For example, in motor applications it is common to use three sensors ideally placed at exactly 0, 120 and 240 degrees about the rotational axis, all in the same plane and having the same orientation. In practice there are invariably errors in the placement that contribute to errors in the estimated rotational position of the motor.

There exists, therefore, a need for a self-calibrating phase estimation method and apparatus that is matched to encoder systems that do not have exactly four detectors per sinusoidal cycle, that have widely separate detectors that do not share common electronic properties, that have discrete detectors that may be displaced in phase from their design positions, that have detectors that are substantially point detectors relative to the period of the sinusoidal signal, and that may have significant variation in signal strength ("gain") and offset from detector to detector.

The present invention relates to an apparatus and method for determining the instantaneous phase angle of a quasi-sinusoidal signal, based on two or more samples of the signal, wherein the quasi-sinusoid sampled signals may have variable amplitudes, phase shifts, and/or offsets. Typically the quasi-sinusoidal signal is generated by the movement of a physical object relative to a number of fixed sensors, such as in the above-mentioned motor application for example. The apparatus comprises at least two signal sources (e.g., sensors) that produce samples of the signal for an electronic processor wherein processing electronics, typically microprocessor based, combine the two or more signal samples and adaptively compensate (or calibrate) their magnitude, phase, and offset errors to better estimate the position of the physical object (the signal generator), which position is related to the phase. The invention is applicable to absolute encoder systems. Note that "encoder" and "position sensor" are used interchangeably herein. Also, the terms "sensor" and "detector" are used interchangeably as well.

In one embodiment, a primary correlation phase (PCP) processor receives input signals, $S_M$, from two or more detectors, the detectors each sampling the output from a quasi-sinusoidal signal generator. The PCP processor performs two weighted summations of the input signals to generate two output values, the values related to the quadrature components of a phase vector having the phase of the signal source. These summations can be expressed in matrix multiplication format as:

$$\begin{bmatrix} y \\ x \end{bmatrix} = \begin{bmatrix} W_{y1} & \cdots & W_{yM} \\ W_{x1} & \cdots & W_{xM} \end{bmatrix} \begin{bmatrix} S_1 \\ \vdots \\ S_M \end{bmatrix}$$

where x and y are the quadrature components (i.e., the cosine and sine components) of a mathematical phase vector or phasor $V=e^{j\Phi}$, the 2×M matrix is the weighting matrix, and the 1×M column vector contains the sampled input signals from the detectors. The weights ($W_{nm}$) are determined in part based on the design of the apparatus.

This embodiment further comprises a phase vector calculator which transforms the two quadrature values into a magnitude (MAG) and a phase ($\phi$) value using the following well-known relationships:

$MAG=[x^2+y^2]$ and $\phi=\arctan(y/x)$.

The calculated phase value may serve as an indicator of the instantaneous phase angle of the quasi-sinusoidal signal.

The phase estimation method and apparatus further includes a pre-quadrature calibration circuit that generates variable calculation values used by the PCP in calculating the quadrature values. The variable calculation values may include the weights for the weighting matrix described above, and/or adjusted values of the input signal samples, where the adjustment of either or both tends to remove errors in the quadrature signals and achieve greater accuracy.

In some pre-quadrature calibration embodiments there is a separate secondary correlation processor (SCP)/vector calculator combination for each detector. Each detector signal, it will be noted, is a sinusoid and the phase of that sinusoid, relative to those from the other detectors, is related to the relative spacing of the detectors around the signal generator. As the input signal changes, each detector signal is sampled at at least three, but more generally four phase points, for example, once each 1.571 radians of measured phase change at the output of the PCP/phase vector calculator. In addition to the signal magnitude and phase, these additional correlation phase processors can also be programmed to calculate the offset of the detector signals. These individual signal gain, phase, and offset values may be used to calibrate the phase estimation method.

In some embodiments, the calibration subsystem accepts input values for the various gains, phases and offsets and generates modified weights in the weight matrix to be used in the PCP. In some instances the calibration subsystem generates an offset vector that is subtracted from the input signal vector and in other instances a gain vector that multiplies the input signal vector.

In some instances the input to the invention comprises three signals while in other instances the input comprises four signals. In the former instances the signals are relatively displaced from each other in phase by 2.094 radians (nominal) while in the latter instances the signals are relatively displaced in phase by 1.571 radians (nominal). The fixed weights in the two summations in the correlation phase processor are, accordingly, proportional to $\sin(m\delta)$ and $\cos(m\delta)$, $m=0,1,\ldots,M-1$, where $\delta$ is the relative phase displacement and M is the number of input signals.

Additionally, some embodiments of the invention comprises a "post-quadrature" calibration subsystem. A post-quadrature calibration subsystem is one that applies one or more calibrations to the output of the PCP processor—that is, it applies its calibrations to the PCP's resultant quadrature components, before they are processed by the phase vector calculator. This calibration subsystem submits the magnitude and phase outputs from the phase vector calculator to a rule-based logic engine which incrementally generates appropriate gain, offset, and phase shift calibration coefficients to drive the locus of the tip of the phasor toward be a perfect circle. These calibration coefficients modify the two quadrature signals (x,y) before they enter the phase vector calculator. This calibration subsystem can operate in a negative feedback, closed loop designed to converge on and maintain the best possible calibration coefficients. Further, the calibration subsystem can be configured to operate autonomously, so it substantially continually updates the calibration coefficients, or on-command only.

In another embodiment the phase estimation method and apparatus comprises an input signal conditioner. The input signal conditioner may correct for known defects in the input signals such as unequal signal gains or offsets. For example, the signal conditioner may average each input signal over at least one full cycle of the sinusoid to determine offset values or may track peak and valley values to determine signal gains.

The phase estimation method may be included in products such as position encoders and used during their operation, either continually or on an as-needed or as-commanded basis. Alternatively or in addition, the phase estimation method may be used at a time of manufacturing a particular system in which phase estimation is used, such as a motor system having position sensing circuitry. In this case, the use of the method during manufacturing yields weights and/or calibration coefficients that are incorporated into the operational circuitry and may remain fixed for relatively long periods or even indefinitely. For example, the values obtained by the use of the method during manufacturing can be stored in lookup tables or analogous structures from which they are retrieved for use in calculations during later ongoing regular operation. The method is preferably performed under expected operational conditions, and it need not be lengthy in duration because final values can be obtained over only a few periods of the input signals.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE SEVERAL VIEWS OF THE DRAWING

The foregoing and other objects, features and advantages of the invention will become apparent from the following description in conjunction with the accompanying drawings, in which reference characters refer to the same parts throughout the different views. The drawings are not necessarily to scale; emphasis has instead been placed upon illustrating the principles of the invention. Of the drawings.

DETAILED DESCRIPTION OF THE INVENTION

Figure 1:
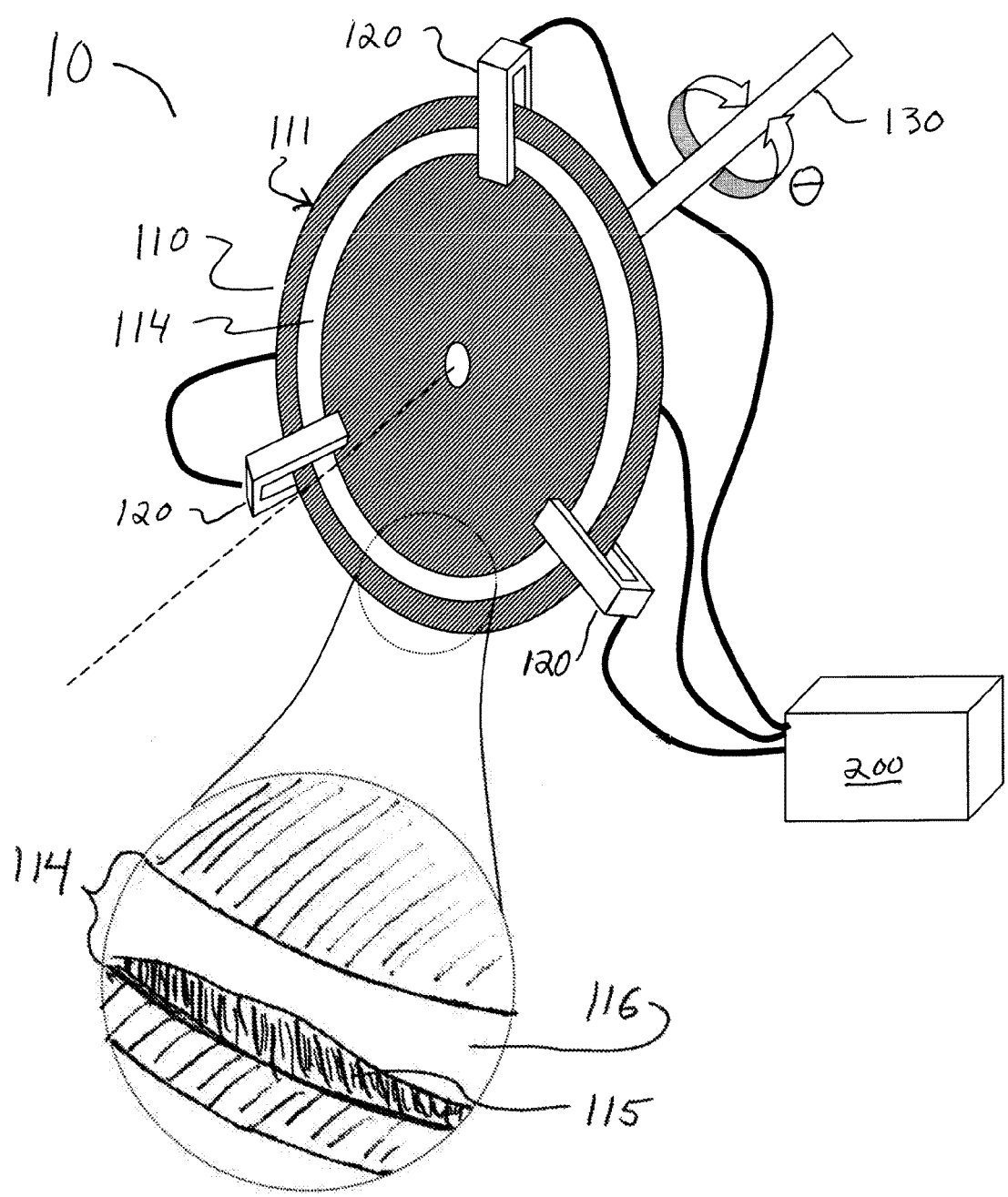
FIG. 1 is a schematic illustration of a rotary absolute encoder system.

FIG. 1 is a schematic illustration of a rotary absolute encoder system 10 that uses widely separated, discrete sensors. Encoder system 10 comprises a single-track disk 110, nominally identical sensors 120, and a digital electronic processing system 200. Disk 110, in this exemplary embodiment, is a glass disk mounted on a shaft 130 of a motor, which shaft is the object whose angular position is to be measured. Disk 110 has an outer edge 111. A variable transmission optical track 114 is disposed close to outer edge 111 with the remaining sections of the disk surface being coated with an opaque material. Optical track 114 comprises an opaque region 115 and a nominally transparent region 116, wherein the track is area-modulated in the radial direction to create a raised sinusoidal optical transmission function around the perimeter of the disk; that is, the optical transmission function takes the form:

$$T(\theta) = A + B \cos(\theta) \quad (1)$$

where θ is the angular position around the perimeter of the disk relative to a pre-determined but arbitrary starting point, A is an offset and B is the amplitude of the cosine. In one embodiment, the angular period of the sinusoidal optical transmission function is 360 degrees or one full rotation; it may have different values in alternative embodiments.

The rotary absolute encoder system 10 comprises M identical sensors 120, wherein M is an integer greater than or equal to 2 and typically greater than or equal to 3. In some embodiments M equals 4 or more. In the illustrated embodiment the sensors 120 may be semiconductor photo-detectors that are individually paired with a solid state light source (not illustrated) such as a light-emitting diode, the photo-detector and the light source being disposed on opposite faces of disk 110. As is well-known by those skilled in optical encoders, each paired light source and photo-detector will be disposed to illuminate an angular region of track 114 and to sense the light passing therethrough. The illuminated and sensed region of track 114 is, by design, commensurate with the size of the maximum transmissive region of area-modulated track 114. The electrical outputs from the sensors 120 are generally linearly related to the average light intensity reaching their photo-sensitive areas and thereby are related to the section of area-modulated track 114 that is positioned between the source and the photo-detector. Typically sensors 120 are distributed uniformly around the circumference of disk 110, although this uniform distribution may not be used in specific designs.

It should be noted that the encoder system 10 discussed above is but one example of a once-per-revolution sinusoidal signal generator to which the apparatus and method of phase estimation described herein may be applied. In other embodiments, for example, the apparatus and method of phase estimation described herein may be applied to a magnetic encoder, wherein the physical state of a rotatable magnet is estimated from signals generated by magnetic field sensors such as Hall effect sensors. The rotating magnet may be the rotor of a motor, for example.

Figure 2:
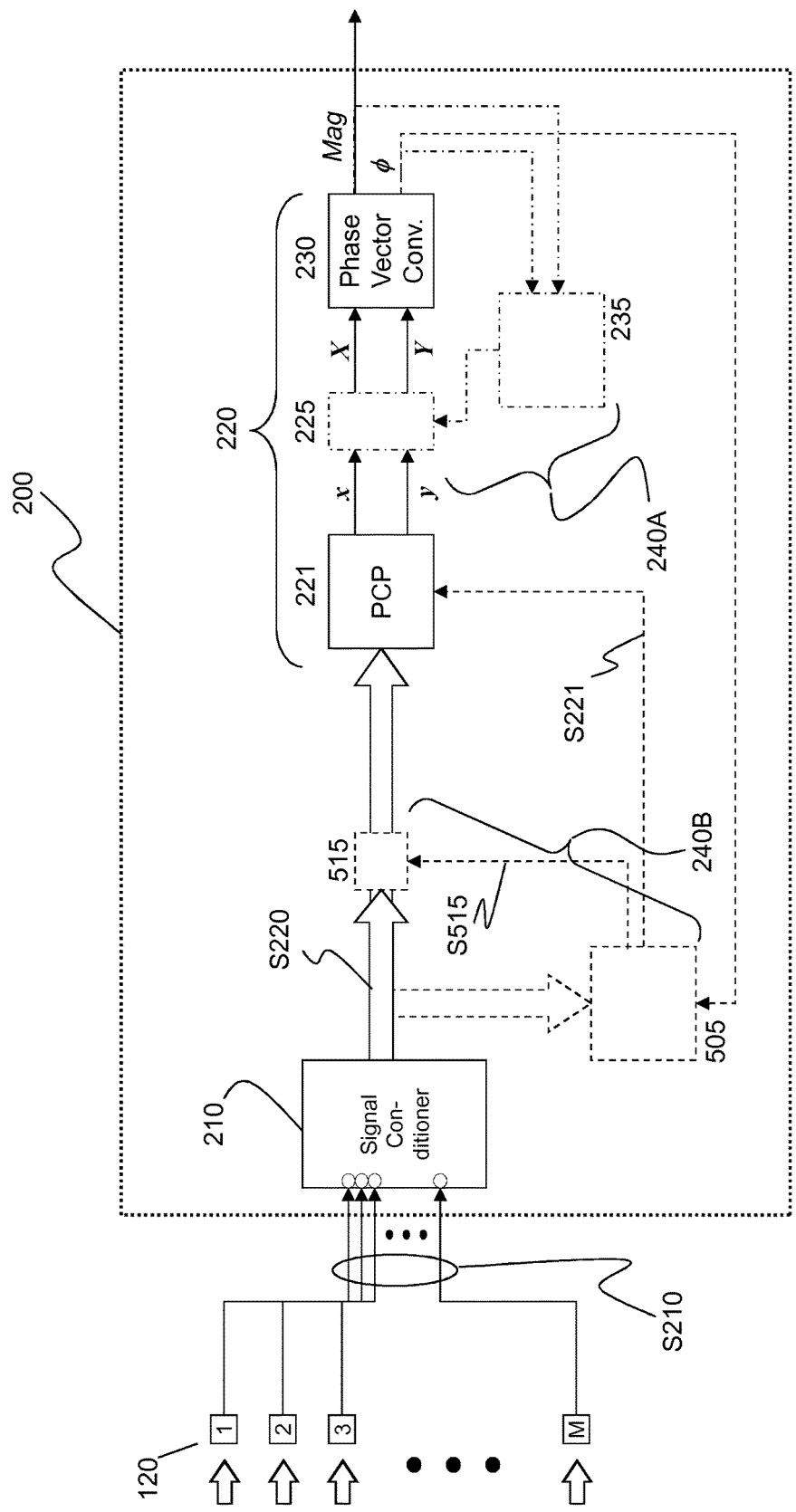
FIG. 2 is a block diagram of an embodiment of the phase estimation apparatus and method.

FIG. 2 is a block diagram of phase estimation circuitry embodied in the apparatus of processing system 200. Sensors 120 form a set of signal sources for a digital electronic processing system 200. Processing system 200 comprises a signal conditioner 210, which conditioner includes one or more analog-to-digital converters and various conventional analog or digital means for adjusting and adapting the raw input signals for further digital processing. Processing system 200 further comprises a phase estimator 220, itself comprising a primary correlation processor (PCP) 221 and a phase vector converter 230. The processing system may also include either one or both of two calibration subsystems 240A, 240B shown in dashed lines.

The description below may alternatively refer to elements of the processing system 200 as steps or functions, as the diagram also generally represents a flow of processing and functions performed in the flow. As mentioned below, the processing system 200 may be implemented using programmed processing circuitry (e.g., a microprocessor) and specialized software or firmware, in which case the components of processing system 200 may correspond to modules or other organizational elements.

The output signals from signal sources 120 form a measured signal set S210 comprising M individual signals S210-M, wherein the M signals relate to the M signal sources respectively.

Signal set S210 takes the form of M, phase-shifted samples of the same sinusoidal signal. That is, $$S_m(\theta) = A_m + R_m \cos\left(\frac{2\pi\theta}{360} + \varphi_m\right) \quad (2)$$

where the subscript, m, indicates the signal S is from the $m^{th}$ signal source 120 and $\varphi_m$ is the nominally constant phase shift associated with the $m^{th}$ signal source. For example, if phase is referenced to the signal source coming from an arbitrarily selected "first" sensor 120-1, then the signal source associated with another sensor 120 disposed on the disk diametrically opposed to said "first" sensor will have a phase shift, $\varphi_m$, equal to π radians.

By design, sensors 120 are disposed such that measured signal set S210 is not fully redundant; that is, at least one member of the set comprises at least some data that are mathematically orthogonal to the data in the other members of the set. For example, taken collectively, the set contains data that is related to both sin(θ) and cos(θ). This condition is met when any pair of signals in the set is neither in-phase nor 180 degrees out-of-phase. Complete non-redundancy occurs when there is at least one signal pair that is 90 degrees out-of-phase with each other.

Signal set S210 is received by processing system 200 at the input to signal conditioner 210. Since each signal in set S210 originates from a unique analog sensor 120, signal conditioner 210, as is conventional in the art, typically contains parallel channels of amplifiers and filters to remove noise and match the signals in amplitude. Signal conditioner 210 further comprises one or more analog-to-digital converters. It is important that all of the signals in set S210 be sampled and digitized substantially simultaneously since any sample time difference will appear later as a variable phase-shift error in the measurement.

In some systems, the underlying sensor system is unipolar—that is, the raw electrical signals do not take on both positive and negative values. For example, the optical encoder described in FIG. 1 has a signal that is unipolar since light intensity is never negative. The average signal value over the full range of the encoder is referred to as DC offset or just "offset", which, being independent of encoder position, carries no meaningful information. In such systems it may be desirable to incorporate adjustable DC offset correction in signal conditioner 210. DC offset correction may also be used in system with bipolar sensors. The magnitude of the DC offset correction can be determined and set manually, for example during system setup, or automatically and substantially continually during operation, or a mix of both approaches. In either approach the average value of each post-correction signal is typically calculated over one or more full $2\pi$ variations in input range (e.g., full revolutions of an encoder disk). That average is then used as the input for DC offset correction. If the correction is performed continuously, then it is desirable to treat it as a feedback signal in a type 1 servo loop to prevent instability.

The output signal set S220 from signal conditioner 210 is the input for phase estimator 220. In typical embodiments the phase estimator is correlation-based. In general, for a continuous sinusoidal signal of magnitude R and instantaneous phase $\phi$, a correlation phase estimator multiplies an input sinusoidal signal with both a reference sine and a reference cosine and integrates the two resulting product functions over one or more periods of the reference sinusoids. The two intermediate integration results are respectively proportional to the two quadrature components of the phase of the input sinusoid (relative to the phase of the reference sinusoids). That is, for an input signal of the form of equation (2), the intermediate results are equal to $R\sin(\phi)$ and $R\cos(\phi)$ respectively, where the bias (or offset) value, A, is automatically filtered out by the correlation process.

Once these quadrature results are available it is easy to evaluate the magnitude and phase of the input signal using the well-known equations:

$$MAG = R = R \times SQRT[\sin(\phi)^2 + \cos(\phi)^2]$$

$$\phi = \text{Arctan}[\sin(\phi)/\cos(\phi)] \quad (3)$$

In the exemplary phase estimation method the input signal is not continuous but, instead, comprises M discrete samples of a sinusoid wherein the sample points are distributed over $2\pi$. In this configuration the continuous-case integration process becomes a discrete summation process. Furthermore, in the typical embodiment of a discrete correlation phase estimator the M sample points are uniformly distributed. When this condition applies, the phase estimation process is described by the equation:

$$\tan(\varphi_t) = \frac{\sum_{1}^{M} S_{t,m}\sin[2\pi(m-1)/M]}{\sum_{1}^{M} S_{t,m}\cos[2\pi(m-1)/M]}, \text{ or} \quad (4)$$

$$\tan(\varphi_t) = \frac{y_t}{x_t}, \quad (5)$$

where the quadrature signal estimates $y_t$ and $x_t$ are the numerator and denominator summations of equation (4) and the subscript t has been added to indicate the result is but one of a series of sequential measurements, the measurements having been made at the $t^{th}$ instant.

Figure 3:
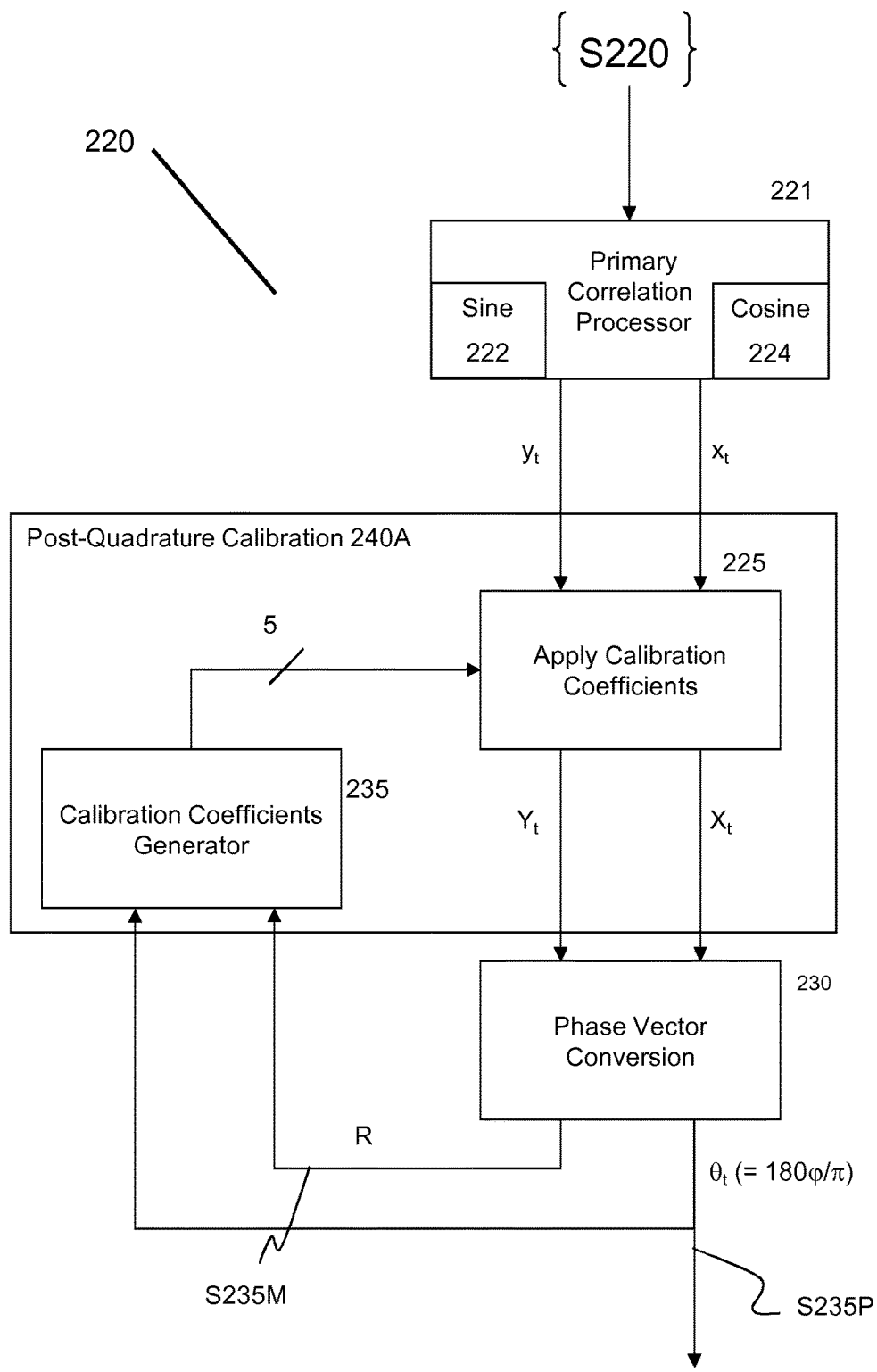
FIG. 3 is a block diagram of one configuration of the phase estimation and calibration method.

Referring now to FIG. 3, correlation phase estimator 220 comprises PCP 221 and phase vector converter 230. Also shown are two components of the optional calibration subsystem 240A of FIG. 2, which is referred to herein as the "post-quadrature" calibration subsystem 240A. These components are a coefficients generator 235 and a module 225 for applying calibration coefficients to the correlation values x, y.

PCP 221 comprises two sub processors; a sine estimator 222 and a cosine estimator 224. The two sub processors evaluate the numerator summation ($y_t$) and the denominator summation ($x_t$) of equation (4) respectively whilst phase vector converter 230 performs the arctangent evaluation required to extract the phase, $\phi_t$, from the ratio of equation (5). Phase vector converter 230 also estimates the magnitude R from the root-square-sum of the sine and cosine estimates, as shown in equations (3). As will be understood by those skilled in the signal processing art, a phase vector calculator typically does not literally estimate the arctangent of the ratio of the two quadrature values, as shown in equation (5), as that process is limited to a range of output values between $-\pi/2$ to $+\pi/2$. Instead, the processor typically will use a full $2\pi$ range arctangent evaluation algorithm such as the well-known ATAN2 function.

Each of these processors or sub processors may be implemented a variety of forms including non-programmed ("hard-wired") hardware or more general-purpose processing hardware programmed with software or firmware in specifically configured arrangements of known computing apparatuses such as computers, microprocessors, programmable gate arrays or other digital electronic circuitry. Furthermore, the various processing steps have been divided into specific modules, processors, subsystem, or sub processors within processing system 200 for clarity only. In various embodiments the partitioning, arrangement and functional interactions may be different from what is described herein.

The sine and cosine reference values used in equation (4) are constant weighting values applied to every set of signal samples, $S_{t,m}$. As such, many (digital) correlation phase processors fix these weights in firmware or as software constants. Furthermore, it may be noted that the general process of taking multiple weighted sums from a single data set may be expressed mathematically as a matrix multiplication, as in:

$$\begin{bmatrix} y_t \\ x_t \end{bmatrix} = \begin{bmatrix} W_{y1} & \cdots & W_{yM} \\ W_{x1} & \cdots & W_{xM} \end{bmatrix} \begin{bmatrix} S_{t1} \\ \vdots \\ S_{tM} \end{bmatrix}, \quad (6)$$

where the signal vector $\vec{S}_{t,m}$ is the set of signal values S220 and the weights in the matrix are the sampled sine and cosine values shown in equation (4).

It should be noted that the weighting values used in equation (4) are specific to processing M uniformly spaced samples of a sinusoid. In the more general case the weights are the normalized set of sines and cosines evaluated at the perhaps non-uniformly spaced sample points, for example, the $\phi_m$ of equation (2).

The two quadrature component outputs from PCP 221, $x_t$ and $y_t$, are transferred to phase vector converter 230 where the conversions from x and y to a magnitude R and a phase $\theta_t$ (FIG. 3, signals S235M and S235P respectively) are performed using the formulae in equations (3).

As mentioned, processing system 200 may include one or both of calibration subsystems 240. As described below, processing system 200 may include a post-quadrature calibration subsystem 240A or a pre-quadrature calibration subsystem 240B, or processing system 200 may include both calibration subsystems.

As shown in FIG. 3, in one exemplary embodiment post-quadrature calibration subsystem 240A receives the magnitude S235M and phase S235P estimates output from phase vector converter 230. Comparing the samples to an ideal template, the subsystem incrementally generates calibration coefficients (in a Coefficient Generator 235) to be applied or fed back to the inputs of phase vector converter 230.

In the configuration illustrated in FIG. 3, the output magnitude and phase estimate values from calculator 230 are passed to coefficient generator 235. Generator 235 contains a logic engine that compares the estimated magnitude R to a pre-determined nominal vector magnitude, $R_{NOM}$. If the estimated magnitude equals $R_{NOM}$, no calibration changes are required. On the other hand, if the magnitude is not equal to $R_{NOM}$, coefficient generator 235 applies a set of rules (described below) to generate incremental increases or reductions in one or more of five (5) calibration coefficients: Scaling ($G_{x,t}$ and $G_{y,t}$), Offset ($O_{x,t}$ and $O_{y,t}$), and Phase ($P_t$). These calibration coefficients are applied to the output of sine estimator 222 and cosine estimator 224 by the calibration coefficient applying module 225 to produce calibrated quadrature signals as inputs to the phase vector converter 230 using the formulae:

$$X_t = (x_t + O_{x,t} + P_t \times y_t) \times G_{x,t}$$

$$Y_t = (y_t + O_{y,t}) \times G_{y,t} \qquad (7)$$

(note the difference between the variable "$x_t$" and the multiplication sign "×"), where $x_t$ and $y_t$ are pre-calibration quadrature signals and $X_t$ and $Y_t$ are post-calibration quadrature signals. In this configuration the various calibration coefficients are incrementally adjusted to drive the magnitude [MAG in Equation (3)] of the phase vector to equal $R_{NOM}$ for all values of the phase $\phi$.

Figure 4:
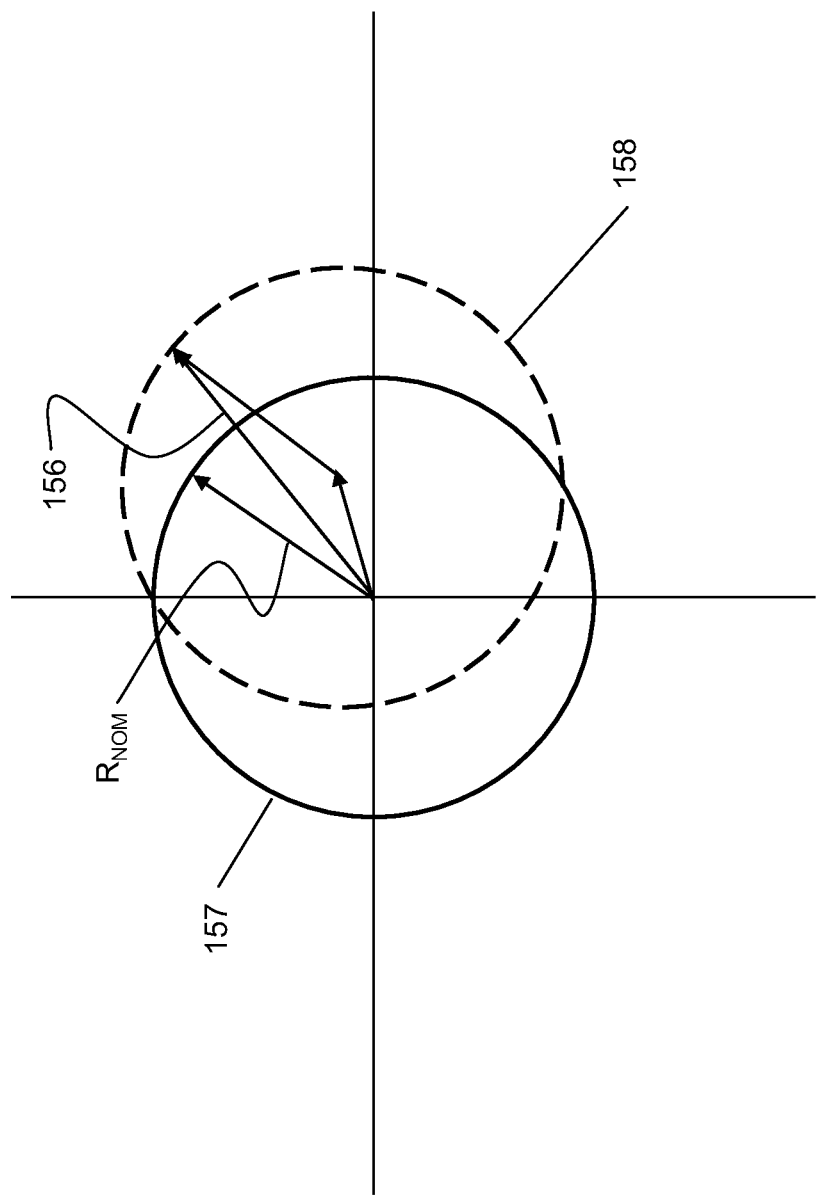
FIG. 4 illustrates schematically the logic for determining calibration adjustments made according to one configuration of the invention.

FIG. 4 is used to describe operation of the coefficient generator 235. It illustrates a normalized unit circle 157 representing an expected location of a phase vector or phasor 156 corresponding to the phase value S235P and S235M, as well as a shifted circle 158 corresponding to an actual location of the phasor 156. Coefficient generator 235 uses the phase signal values S235P and magnitude signal values S235M to automatically and continually adjust the calibration coefficients that are applied to the quadrature components in accordance with equation (7) in calibration subsystem 240A. In the exemplary system, the coefficient generator 235 applies a set of logical tests (see Table 1 below) to decide if the phasor 156 represented by phase value S235P and magnitude value S235M lies on the normalized unit circle 157. If the tip of phasor 156 is not on circle 157 (e.g., it is on a shifted circle 158), the subsystem 240A increments/decrements the various calibration coefficients (collectively, coefficients S225) until phasor 156 does lie on circle 157. Each increment/decrement is preferably small, for example one LSB, so the effect of any one adjustment to the calibration coefficients is nearly imperceptible. Note that the logic engine in coefficient generator 235 has only two simple tests to perform: 1) is MAG greater than or less than $R_{NOM}$, and 2) in which of 16 "spaces" (sectors of a unit circle) does the phase lie, where the spaces are identified in Table 1. Note that no adjustments are made in the odd-numbered spaces nor when the magnitude is equal to the unit circle radius.

TABLE 1

| Sector | | | Magnitude | | | | | |
| --- | --- | --- | --- | --- | --- | --- | --- | --- |
| | | | >Unit Circle Radius | | | <Unit Circle Radius | | |
| From | To | Space | Gain | Offset | Phase | Gain | Offset | Phase |
| 348.75 | 11.25 | 0 | Gx = Gx − 1 | Ox = Ox − 1 | — | Gx = Gx + 1 | Ox = Ox + 1 | — |
| 11.25 | 33.75 | 1 | | | | | | |
| 33.75 | 56.25 | 2 | — | — | P = P − 1 | — | — | P = P + 1 |
| 56.25 | 78.75 | 3 | | | | | | |
| 78.75 | 101.25 | 4 | Gy = Gy − 1 | Oy = Oy − 1 | — | Gy = Gy + 1 | Oy = Oy + 1 | — |
| 101.25 | 125.75 | 5 | | | | | | |
| 123.75 | 146.25 | 6 | — | — | P = P + 1 | — | — | P = P − 1 |
| 146.25 | 168.75 | 7 | | | | | | |
| 168.75 | 191.25 | 8 | Gx = Gx − 1 | Ox = Ox + 1 | — | Gx = Gx + 1 | Ox = Ox − 1 | — |
| 191.25 | 213.75 | 9 | | | | | | |
| 213.75 | 236.25 | 10 | — | — | P = P − 1 | — | — | P = P + 1 |
| 236.25 | 258.75 | 11 | | | | | | |
| 258.75 | 281.25 | 12 | Gy = Gy − 1 | Oy = Oy + 1 | — | Gy = Gy + 1 | Oy = Oy − 1 | — |
| 281.25 | 303.75 | 13 | | | | | | |
| 303.75 | 326.25 | 14 | — | — | P = P + 1 | — | — | P = P − 1 |
| 326.25 | 348.75 | 15 | | | | | | |

The logical tests can be applied with a variety of rules. For example, the coefficient generator 235 may apply the tests each time a sample phase is recorded. Alternatively, in a preferred implementation, the tests are only applied if the current phase angle of the phasor is in a different quadrant than the phase value at which the last adjustment was made to the calibration coefficients. This preferred mode prevents the same correction from being applied over and over again when the underlying source is not moving relative to the detectors. Another alternative is to calibrate the system once, to accommodate manufacturing and/or initial set up effects, and then to lock those calibration values in for all future measurements (or at least until a recalibration command is applied). Remillard, in U.S. Pat. No. 6,897,435 (incorporated herein by reference), described this process in detail.

Referring again to FIG. 2, processing system 200 may include a pre-quadrature calibration subsystem 240B. As shown in FIG. 2, in one exemplary embodiment pre-quadrature calibration subsystem 240B employs a coefficient generator 505 to generate one or more sets of calibration coefficients S221 and S515 which are applied at different points in the signal processing chain as compared to the post-quadrature subsystem 240A. Specifically, the calibration inherent in equation (7) is applied after quadrature component estimation in PCP 221 whereas the configuration illustrated in FIG. 5 generally applies the calibration prior to, or as part of, the quadrature component estimation. In pre-quadrature calibration subsystem 240B, explicit estimates of the magnitude, offset, and relative phase of each sensor 120 are used to adapt/calibrate correlation phase estimator 220 and/or the input signals themselves. It may be noted that the two calibration approaches are independent and operate in series with one another. They may be used in embodiments of the phase estimation method to individually improve the phase estimation accuracy or they may be used together in one phase estimation system. Furthermore, in embodiments where sensor parameters are expected to be relatively stable, the pre- or post-quadrature calibration method and apparatus may be used to calibrate the system once at a time of manufacturing or other initial deployment, to accommodate manufacturing and/or initial set up effects, and then to lock those calibration values in for all future measurements (or at least until a recalibration command is applied).

For clarity, but with no loss of generality intended, the pre-quadrature calibration subsystem 240B is described herein in the context of one exemplary embodiment using a minimal number (three) of sensors 120. The principles and method described here are in no way limited to this exemplary embodiment. The exemplary embodiment is an encoder similar to the one depicted in FIG. 1 that comprises three sensors 120. Sensors 120 are preferably disposed (nominally) at θ=0, θ=120, and θ=240 degrees relative an arbitrary starting position. Note that the Greek letter θ is used herein to denote physical angles in degrees (such as the position of a sensor around the disk) while the Greek letter ϕ is used to represent trigonometric phase in radians. Ideally the detectors and processing electronics for different sensors are substantially identical as designed and manufactured, so each detector's raw signal, $I_m(\phi)=A+R\cos(\phi+\pi\theta_m/180)$, has approximately the same offset A and amplitude R (or they can be made identical by adjustments in signal conditioner 210).

In this exemplary embodiment, the calibration coefficients S221 serve as weights used by the PCP 221, in which the digitized output of signal conditioner 210 (signal set S220) is processed by the sine estimator 222 and cosine estimator 224, which together implement the matrix multiplication $$\begin{bmatrix} R\sin(\phi) \\ R\cos(\phi) \end{bmatrix} = \begin{bmatrix} x \\ y \end{bmatrix} \quad (8)$$

$$= \begin{bmatrix} 1 & -0.5 & -0.5 \\ 0 & 0.866 & -0.866 \end{bmatrix} \begin{bmatrix} A+R\cos(\phi) \\ A+R\cos(\phi+120) \\ A+R\cos(\phi+240) \end{bmatrix}$$

where the initial weights in the weight matrix will be recognized as the sine and cosine of 0, 120, and 240 degrees. The output of PCP 221 is transferred to phase vector converter 230, which converts the two quadrature values into magnitude S235M and phase S235P using the well-known formulae.

Figure 5:
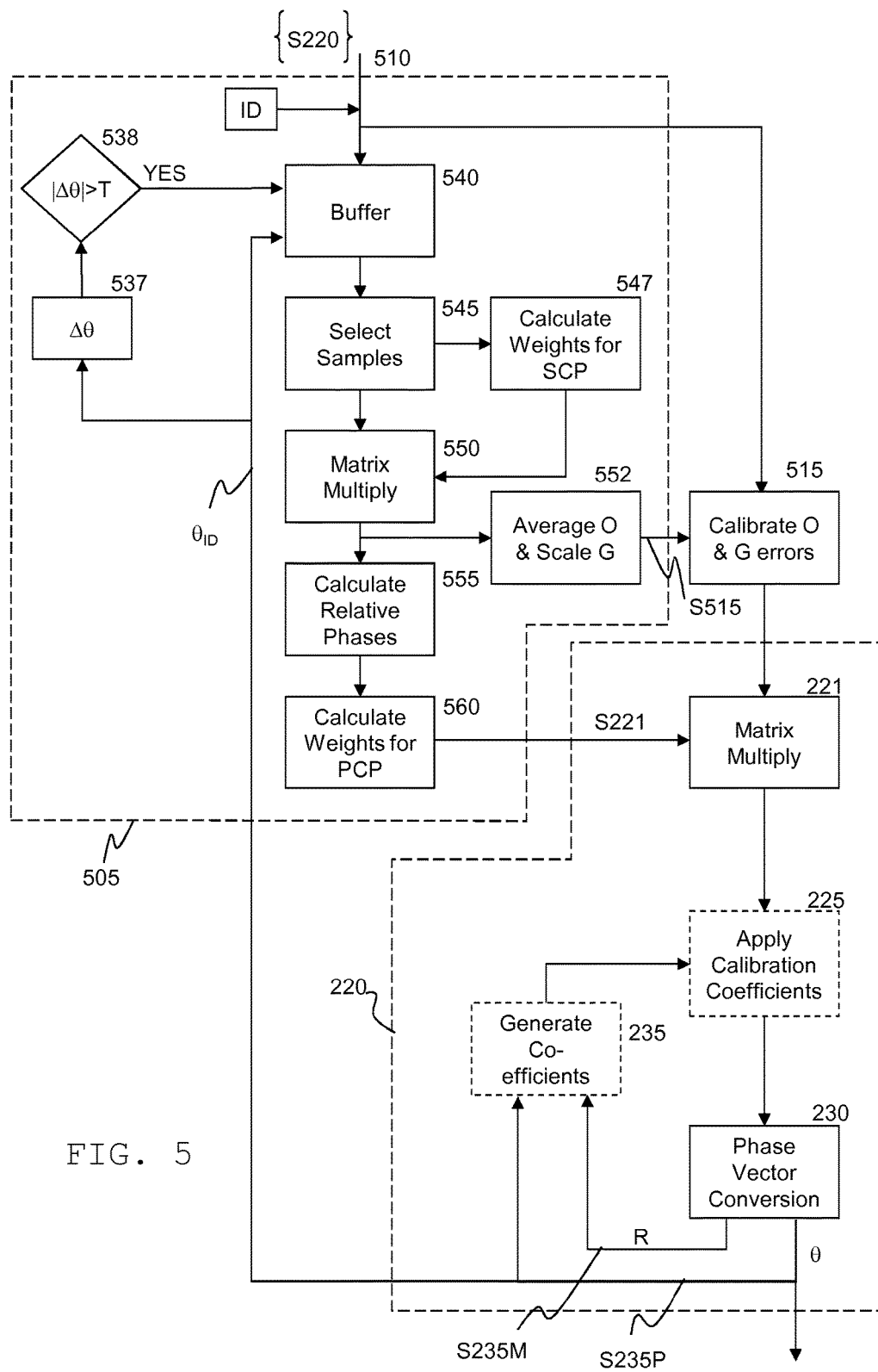
FIG. 5 is a block diagram of a second configuration of the phase estimation and calibration method.

FIG. 5 illustrates the pre-quadrature calibration subsystem 240B. Note that for clarity of exposition, the elements in FIG. 5 may, at different times, be syntactically referenced as processing steps or as processing modules that perform those steps. The processing flow starts at signal input step 510, which is the transfer of signal set S220 from signal conditioner 210. As previously mentioned, signal set S220 comprises one digitized sample from each of the M signal sources (viz., sensors 120), where the sampling is simultaneous. In addition to the M signal values, this calibration approach further comprises tagging each sample set with an identifying number, ID, which is used for tracking purposes only. The ID may be a sequential number attached to all the data that is sampled at one instant.

The sampled signals are sent to two parallel processing channels. One channel comprises the previously described phase estimation process performed in correlation phase estimator 220. These steps are illustrated on the right hand side of the diagram as a matrix multiplication step 221 (corresponding to the PCP 221) and a phase vector conversion step 230 (corresponding to the phase vector calculator 230). This channel also includes a pre-quadrature calibration step 515 of removing signal gain and offset errors prior to performing matrix multiplication step 221. Also illustrated as part of this channel are the optional post-quadrature calibration steps (coefficient generation 235 and coefficient application 225). Some embodiments will preferably include both pre- and post-quadrature calibration processes. At each step of the process, the derived values maintain the identification number, ID, of the original data.

The second, parallel channel illustrated in FIG. 5 comprises steps for the generation/calculation of the pre-quadrature calibration process 240B. Each received data set S220 is stored in a buffer, step 540, to build up at least one full cycle of each sinusoid. In addition to the incoming data, the buffer also stores the associated estimated angular position values, $\theta_{ID}$, produced later at step 230 and retrieved therefrom. The estimated position values are associated with the signal samples from which they were produced by their common ID numbers. Typically the buffer will delete the oldest samples (those with the lowest ID numbers) to make room for the most recent samples.

Optionally, signal buffering step 540 may be gated by a movement threshold test 538. If the underlying signal generator is not moving (or is moving slowly relative to the sample rate), then the signal samples at step 510 are substantially unchanging. Movement threshold test 538 freezes the contents of buffer 540 (i.e., it temporarily refrains from recording new samples) whenever the change in estimated signal generator position (as calculated in differencer 537) is less than a pre-determined (but optionally adaptable) threshold value, T. It may be noted that there is a delay between the movement of the signal generator and the calculated position change, which will result in some redundant signal values being loaded into the buffer when the signal generator stops and a loss of some usable signal samples when the signal generator starts moving. However, such effects simply reflect the fact that the signal calibration process operates most effectively when the signal generator is moving.

In a general sense, the data in the signal buffer 540 can be thought of as a table with M+2 columns: M columns in which each column stores the output from one signal source over a preceding time period, one column storing the estimated signal generator position $\theta_{ID}$ from phase vector converter 230, and one column for the ID tagging numbers, where the data in any given row of this table represents simultaneously collected/generated information.

Data from selected "rows" of this table are copied from buffer 540 by a sample selection step 545. The criteria used in selection step 545 are typically pre-determined. Generally it is desirable to have at least three samples per complete cycle of the signal generator and preferable in many embodiments to have four samples per cycle. It is also preferable to have the samples spread substantially uniformly over the cycle. In one preferred embodiment the samples are selected to be substantially 90 degrees apart, as measured by the angular position values, $\theta_{ID}$. For example, the four selected samples may be separated by nominal estimated angular position values of 0, 90, 180, and 270 degrees.

Generally, because of the inherent randomness in sampling times, the selected angular position values are slightly displaced from their ideal values. For example, the 4 angular position values might be: $\theta$, $\theta+90+\epsilon$, $\theta+180+\alpha$, and $\theta+270+\beta$ where $\theta$ is the arbitrary position of the first sample and $\epsilon$, $\alpha$, and $\beta$ are the small differences from the nominal 90 degree shifts that are inherent in using operationally collected data.

The selected angular position values are transmitted to a correlation weight calculation step 547 whilst the sampled signal data are transmitted to a matrix multiplication step 550, said matrix multiplication step comprising an M-channel, secondary correlation phase (SCP) processor which may be substantially identical to that described as PCP 221. In addition, matrix multiplication step 550 may include an additional row of weights in the matrix wherein these additional weights generate an estimate of the offset of each signal.

As has been noted above, the weights in a discrete correlation phase estimator are proportional to the reference sine and cosine evaluated at the same phase steps as the signals being sampled. Thus, for the approximate 90 degree samples in the exemplary embodiment the correlation weight calculation step 547 generates weights to fill a matrix such as:

$$\begin{bmatrix} \sin(0) & \sin(90-\varepsilon) & \sin(180-\alpha) & \sin(270-\beta) \\ \cos(0) & \cos(90-\varepsilon) & \cos(180-\alpha) & \cos(270-\beta) \\ 1 & 1 & 1 & 1 \end{bmatrix} \quad (9)$$

where the top row generates the y quadrature values, the middle row generates the x quadrature values, and the bottom row approximates the average offset of the signal. For PCP 221 these are the (x, y) values shown in FIG. 2, while for the SCP represented by matrix multiplier 550 there are generally M sets of x and y values, one for each sensor 120. The specific example of three sensors 120 is described below. It will also be noted that for the case of perfect 90 degree phase shifts, the top two rows of this matrix degenerate into the well-known "4-bin" phase estimation process.

Matrix multiplication step 550 is, in one embodiment, a multi-channel processor comprising sine, cosine, and offset estimators for each of the M signal sources. The matrix multiplication step 550 is followed by a relative phase calculation step 555 that converts the M sets of quadrature values into M phases and then references the M phases to the arbitrarily selected "first" sensor's phase.

In the exemplary system illustrated in FIG. 5 in which there are three sensors and four samples per cycle, matrix multiplication step 550 provides three sets of quadrature output values (and three offset estimates):

$$\begin{bmatrix} y_0 & y_{120} & y_{240} \\ x_0 & x_{120} & x_{240} \\ A_0 & A_{120} & A_{240} \end{bmatrix} = \quad (10)$$

$$\begin{bmatrix} \sin(0) & \sin(90-\varepsilon) & \sin(180-\alpha) & \sin(270-\beta) \\ \cos(0) & \cos(90-\varepsilon) & \cos(180-\alpha) & \cos(270-\beta) \\ 1 & 1 & 1 & 1 \end{bmatrix}$$

$$\begin{bmatrix} S_0(0) & S_{120}(0) & S_{240}(0) \\ S_0(90+\varepsilon) & S_{120}(90+\varepsilon) & S_{240}(90+\varepsilon) \\ S_0(180+\alpha) & S_{120}(180+\alpha) & S_{240}(180+\alpha) \\ S_0(270+\beta) & S_{120}(270+\beta) & S_{240}(270+\beta) \end{bmatrix}$$

Optionally, these output values may be averaged over multiple evaluations to smooth the data. The output values from this step are transmitted to relative phase calculation step 555 and to a gain and offset conditioning step 552. In addition, but not illustrated, offset estimate at the output of conditioning step 552, which is the averaged offset for each channel, may be fed back (that is, subtracted from the input signals) to the input of matrix multiplication step 550 to further improve the accuracy of the phase, magnitude and offset estimates. It will be understood by those familiar with feedback loops that averaging the offset over a significant number of samples is effectively an integration step that makes the herein described configuration a stable, type 1 servo-loop.

Continuing with FIG. 5, conditioning step 552 performs three functions. First, it smoothes by averaging each of the 3M output signals from matrix multiplication step 550. Secondly, it matches the magnitudes (by providing scaling constants designated as gains) of the M signals being used as inputs to correlation phase estimation step 220. The absolute peak-to-valley swing of any of the M sinusoids is not critical for accurate phase estimation but all signals preferably have the same peak-to-valley swing. Conditioning step 552 generates a gain factor for each of the M signals that will allow them to substantially reach this condition. Thirdly it generates an estimate of the offset of each of the M signals, this offset being one of the calibration coefficients. The gain and offset coefficients generated in conditioning step 552 are applied to the M signals at signal correction step 515 using the formula:

$$S=G*(s-O)$$

where S is the corrected signal, s is the input signal, and G and O are the gain and offset coefficients respectively for that particular input signal.

Referring again to FIG. 5, the M phase values from matrix multiplication step 550 are transferred to phase subtraction step 555. While the absolute phase value of each signal is constantly changing as the signal generator moves, the relative phases between signal 1 and signal 2, signal 1 and signal 3. etc. remain constant, where the value of the constant depends on where the physical detectors are disposed around the perimeter of the signal generator. Ideally, by design, the phase increment between the signals are identically equal to one $M^{th}$ of a cycle. For three detectors the phase increments should be identically 120 degrees, for four detectors they should be 90 degrees, etc. In real embodiments, the phase increments generally have small errors which degrade the accuracy of the phase measurements. The accuracy of the measurements can be improved if the value of these small errors can be calibrated into the matrix weights of the processor.

Phase subtraction step 555 calculates the phase increments, $\delta_j$, between the M measured signals. Since any detector can be declared the reference detector, phase subtraction step 555 subtracts the instantaneous phase of the designated reference detector from each of the other phases, producing M−1 phase increments. As with the offsets and gains, the phase increments can be smoothed by averaging.

The M−1 phase increments from phase subtraction step 555 are sent to a weight generation step 560 in which the M−1 measured phase increments are compared to the nominal phase increments. The differences between the measured increments, $\delta_j$, and the nominal ("design") increments, $\Delta_j$, are the sampling errors, $\epsilon_j$, where $\epsilon_j=\Delta_j-\delta_j$. Based on the sampling errors, calibrated matrix weights are calculated using the formula:

$$Ws_j = \sin(\Delta_j+\epsilon_j) \text{ and } Wc_j = \cos(\Delta_j+\epsilon_j) \quad (12)$$

These weights are then sent to PCP 221, the operation of which has been described previously, wherein they are substituted into the matrix multiplication:

$$\begin{bmatrix} R\sin(\phi) \\ R\cos(\phi) \end{bmatrix} = \begin{bmatrix} y \\ x \end{bmatrix} \quad (13)$$

$$= \begin{bmatrix} \sin(0) & \sin(120+\varepsilon_1) & \sin(240+\varepsilon_2) \\ \cos(0) & \cos(120+\varepsilon_1) & \cos(240+\varepsilon_2) \end{bmatrix}$$

$$\begin{bmatrix} A+R\cos(\phi) \\ A+R\cos(\phi+120) \\ A+R\cos(\phi+240) \end{bmatrix}$$

Where the "hat" notation ($\hat{z}$) is used to indicate that the result is an estimate of the quadrature components and not an exact solution. Equation (13) applies in a three-detector system such as the example described herein; analogous equations are used in systems having other numbers of detectors as will be apparent to those skilled in the art.

To summarize this second calibration approach: in an M detector encoder in which the detectors can be sampled many times in one cycle of the to-be-evaluated sinusoid, each detector is calibrated for gain, offset, and phase errors by individually processing the series of samples collected from that particular detector. These individual detector data streams are processed in secondary correlation phase processors. Preferably the gain and offset calibrations are applied directly to the data stream feeding the primary correlation phase processor. Further, the phase errors between the data sets are used to calculate a calibrated set of weights for use in the primary correlation processor. This calibration approach operates autonomously and can be allowed to operate continuously to compensate for time-varying errors such as thermal drift effects in the detectors. Alternatively, in embodiments where sensor parameters are expected to be relatively stable, the pre-quadrature calibration method and apparatus may be used to calibrate the system once at a time of manufacturing or other initial deployment, to accommodate manufacturing and/or initial set up effects, and then to lock those calibration values in memory for all future measurements or until a recalibration command is given. In yet another alternative embodiment, the pre-quadrature calibration method and apparatus may be used to develop a look-up-table (LUT) of calibration values, where the specific calibration values depend on one or more measurable parameter, for example, operating temperature, and where the values from the LUT are applied to the phase estimation processor as the measurable parameter changes.

This second calibration approach is particular suitable for encoders in which the detectors are physically distinct (that is, where they have no inherent physical relationship to each other). One example of such an encoder is illustrated in FIG. 1. Another, similarly suitable encoder embodiment makes use of the Hall Effect sensors (HES) typically built into DC brushless motors to measure the rotor position. It is common to use these sensors to coarsely measure the rotational position of the rotor (they are there to provide commutation information), but typically the HES are designed to produce a binary output, suitable for commutation but not for accurate and precise rotor angle measurement. It is possible to substitute analog HES's into the motor to produce sinusoidal signals. Embodiments of the phase estimation method and apparatus therefore described herein may be advantageously employed to use these analog HES to measure the absolute angular position of the rotor.

While various embodiments of the innovation have been particularly shown and described, it will be understood by those skilled in the art that various changes in form and details may be made therein without departing from the spirit and scope of the innovation as defined by the appended claims. For example, the invention is in no way limited to the described embodiments for the signal generator or detectors (signal sources). Nor is there any limitation on the number or disposition of the detectors around the signal generator. Different configurations and dispositions of the processing steps of the described method are considered by the inventors to be equivalent to the exemplary configurations and dispositions described herein.

What is claimed is:

1. Apparatus for estimating phase by processing sensor signals from a set of sensors, the sensor signals collectively conveying a sensed phase for a periodically varying state of an object, the sensed phase including an error component due to non-ideal arrangement or performance of the sensors, comprising:

a phase estimation processor operative to (1) apply a first correlation calculation to simultaneously collected samples of the sensor signals to generate first quadrature values for the sensor signals as a set, the first correlation calculation employing variable calculation values, and (2) apply a phase calculation to the first quadrature values to generate an estimated phase indicative of the periodically varying state of the object; and a pre-quadrature calibration circuit operative to (1) apply second correlation calculations to respective sequences of samples of the sensor signals individually to generate respective sets of second quadrature values for each of the sensor signals, (2) apply phase and/or magnitude calculations to the sets of second quadrature values to generate the variable calculation values for the first correlation calculation and thereby compensate for the error component and improve accuracy of the estimated phase, wherein the pre-quadrature calibration circuit is further operative to record successive sets of samples into digital memory along with respective estimated phases of the periodically varying state of the object when the respective sets were generated, and to select from among the recorded samples to form the sequences of samples used in the second correlation calculations to generate the sets of second quadrature values to which the phase and/or magnitude calculations are applied, recorded samples being selected at different phase points over one period of the sensor signal as indicated by respective stored estimated phases.

2. The apparatus of claim 1, wherein the phase and/or magnitude calculations include calculating gain and offset coefficients for the sensor signals, the gain and offset coefficients forming part or all of the variable calculation values, and wherein applying the phase and/or magnitude calculations includes applying gain and offset corrections to the samples of the sensor signals according to the gain and offset coefficients, thereby generating calibrated sensor signal samples used in the first correlation calculation.

3. The apparatus of claim 1, wherein the phase and/or magnitude calculations include (1) calculating relative phases of the sensor signals, and (2) using the calculated relative phases to generate first weights, said weights defining first reference sinusoids and forming part or all of the variable calculation values used in the first correlation calculation.

4. The apparatus of claim 1, wherein the phase calculation is part of a phase vector conversion generating the estimated phase as well as an estimated magnitude, and wherein the phase estimation processor includes a post-quadrature calibration circuit operative to (1) apply an ideal template to the estimated magnitude and phase to generate corresponding calibration coefficients, and (2) apply corrections to the first quadrature values according to the calibration coefficients for use in the phase vector conversion thereby further compensating for the error component and further improving accuracy of the estimated phase.

5. The apparatus of claim 1, wherein the object is a rotating magnet and the sensors are magnetic sensors arranged thereabout, and wherein the periodically varying state is an angular position of the rotating magnet about an axis of rotation.

6. The apparatus of claim 5, wherein the rotating magnet is a rotor in a motor.

7. A position encoder for generating a position signal indicative of a position of an object using the phase estimation apparatus of claim 1, comprising:
a set of sensors operative to convert a position-indicating pattern of energy generated at least partly by the object into corresponding sensor signals; and
the apparatus of claim 1 operating upon the sensor signals to generate the estimated phase as the position signal.

8. A method for phase estimation, comprising:
receiving sensor signals from a set of sensors, the sensor signals collectively conveying a sensed phase for a periodically varying state of an object, the sensed phase including an error component due to non-ideal arrangement or performance of the sensors;
applying a first correlation calculation to simultaneously collected samples of the sensor signals to generate first quadrature values for the sensor signals as a set, the first correlation calculation employing variable calculation values;
applying a phase calculation to the first quadrature values to generate an estimated phase indicative of the periodically varying state of the object;
applying second correlation calculations to respective sequences of samples of the sensor signals individually to generate respective sets of second quadrature values for each of the sensor signals;
applying phase and/or magnitude calculations to the sets of second quadrature values to generate the variable calculation values for the first correlation calculation and thereby compensate for the error component and improve accuracy of the estimated phase, and
recording successive sets of samples into digital memory along with respective estimated phases of the periodically varying state of the object when the respective sets were generated, and selecting from among the recorded samples to form the sequences of samples used in the second correlation calculations to generate the sets of second quadrature values to which the phase and/or magnitude calculations are applied, recorded samples being selected at different phase points over one period of the sensor signal as indicated by respective stored estimated phases.

9. The method of claim 8, wherein the phase and/or magnitude calculations include calculating gain and offset coefficients for the sensor signals, the gain and offset coefficients forming part or all of the variable calculation values, and wherein applying the phase and/or magnitude calculations includes applying gain and offset corrections to the samples of the sensor signals according to the gain and offset coefficients, thereby generating calibrated sensor signal samples used in the first correlation calculation.

10. The method of claim 8, wherein the phase and/or magnitude calculations include (1) calculating relative phases of the sensor signals, and (2) using the calculated relative phases to generate first weights, said weights defining first reference sinusoids and forming part or all of the variable calculation values used in the first correlation calculation.

11. The method of claim 8, wherein the object is a rotating magnet and the sensors are magnetic sensors arranged thereabout, and wherein the periodically varying state is an angular position of the rotating magnet about an axis of rotation.

12. The method of claim 11, wherein the rotating magnet is a rotor in a motor.

13. A method of estimating position of an object using the method of claim 8, comprising:
operating a set of sensors to convert a position-indicating pattern of energy generated at least partly by the object into corresponding sensor signals; and
performing the method of claim 8 using the sensor signals from the sensors to generate the estimated phase as the estimated position of the object.

* * * * *